United States Patent
Botta

(10) Patent No.: US 11,340,697 B2
(45) Date of Patent: May 24, 2022

(54) SYSTEM AND A METHOD TO CREATE EXTENDED REALITY USING WEARABLES AND VIRTUAL ENVIRONMENT SET

(71) Applicant: Rama Krishna Aravind Botta, Visakhapatnam (IN)

(72) Inventor: Rama Krishna Aravind Botta, Visakhapatnam (IN)

( * ) Notice: Subject to any disclaimer, the term of this patent is extended or adjusted under 35 U.S.C. 154(b) by 0 days.

(21) Appl. No.: 17/256,317

(22) PCT Filed: Jun. 29, 2019

(86) PCT No.: PCT/IB2019/055538
§ 371 (c)(1),
(2) Date: Dec. 28, 2020

(87) PCT Pub. No.: WO2020/003253
PCT Pub. Date: Jan. 2, 2020

(65) Prior Publication Data
US 2021/0263585 A1 Aug. 26, 2021

(30) Foreign Application Priority Data

Jun. 29, 2018 (IN) .............................. 201841024357

(51) Int. Cl.
*G06F 3/01* (2006.01)
*G02B 27/01* (2006.01)
(Continued)

(52) U.S. Cl.
CPC .......... *G06F 3/012* (2013.01); *G02B 27/0172* (2013.01); *G02B 27/0179* (2013.01);
(Continued)

(58) Field of Classification Search
CPC .......... G06F 3/012; G06F 3/014; G06F 3/017; G02B 27/0172; G02B 27/0179;
(Continued)

(56) References Cited

U.S. PATENT DOCUMENTS 9,323,325 B2  4/2016 Perez et al.
10,852,828 B1* 12/2020 Gatson ................. G06K 9/4671
(Continued)

FOREIGN PATENT DOCUMENTS

WO    WO2016/130860 A2    8/2018

*Primary Examiner* — Dmitriy Bolotin

(57) ABSTRACT

The present invention provides a system 100 and a method 200 to create extended reality using wearables and virtual environment set in accordance with the present invention is illustrated. The system 100 includes a virtual reality environment set 110, a work station 120, a wearable device 130, a server 150 and a sensory device 140. A module is provided inside the server 150. The module is preinstalled with a 3D model of the virtual reality environment set 110, the module is having a preprogrammed virtual reality environment set boundary to differentiate the projections of the object. The module differentiates the objects or visuals which has to be displayed on the wearable device 130 and the workstation 120 and facilitate in selectively displaying complete and a part of virtual objects and shift the display seamlessly between VR projections and the wearable device 130.

11 Claims, 11 Drawing Sheets

(51) Int. Cl.
*G06T 17/00* (2006.01)
*G06T 19/00* (2011.01)

(52) U.S. Cl.
CPC .............. *G06F 3/014* (2013.01); *G06F 3/017* (2013.01); *G06T 17/00* (2013.01); *G06T 19/006* (2013.01); *G02B 2027/0138* (2013.01); *G02B 2027/0187* (2013.01)

(58) Field of Classification Search
CPC .... G02B 2027/0138; G02B 2027/0187; G06T 17/00; G06T 19/006
See application file for complete search history.

(56) References Cited

U.S. PATENT DOCUMENTS

| | | | |
|---|---|---|---|
| 2016/0239080 A1* | 8/2016 | Margolina | G06F 3/017 |
| 2020/0082598 A1* | 3/2020 | Castaneda | G06T 15/205 |
| 2020/0134877 A1* | 4/2020 | Gould | G06T 19/006 |
| 2020/0242799 A1* | 7/2020 | Huh | G06T 7/75 |
| 2021/0049360 A1* | 2/2021 | Yildiz | A63F 13/213 |
| 2021/0069574 A1* | 3/2021 | O'Dowd | A63B 69/002 |

* cited by examiner

SYSTEM AND A METHOD TO CREATE EXTENDED REALITY USING WEARABLES AND VIRTUAL ENVIRONMENT SET

FIELD OF THE INVENTION

The present invention relates to the field of reality devices. More specifically, the present invention relates to a system and a method to create extended reality using wearables and virtual environment set.

BACKGROUND OF THE INVENTION

The present generation technology has brought in a new era of immersive experiences with virtual realities and augmented realities. The use of these virtual realities is more valuable while playing a video game or watching a sports event, by making it more realistic, engaging, and interactive, with images, sounds, and simulation techniques performed in the user's presence in a virtual three-dimensional (3D) environment. Now the mixed realities had taken over the human, computer, and environment interaction virtually by blending the physical world with the digital world.

Previous technologies which implemented mixed reality has limitations for camera tracking. Most of the reality systems use sensors outside the head-mounted devices for camera tracking where the trackers are placed in the surrounding of the user, thereby marking a certain boundary or perimeter for his movement. This will restrict the user to that particular perimeter because of the virtual world and real world restrictions and also does not have see-through capability. In case if the camera tracking is implemented with a sensor on the head-mounted device, then an extended cord from the device is necessary all through his movement. This method also fails to provide a full degree of freedom for movement and camera tracking.

Apart from camera tracking, in present implementations of mixed reality worlds, the interaction with the virtual part of the mixed reality world is also limited. Interaction with the virtual world can happen in through different forms like haptic sensors, voice commands, device interaction and simulators. The present systems do not have voice recognition or artificial intelligence integrated. They also don't provide interaction through haptic sensors using neural networks which help the application to use the user's muscle tension or movement as a trigger to take decisions.

The present systems also don't use a transparent (see-through) mixed reality device or A.R. wearables like magic leap or HoloLens, which allow applications to overlay their virtual environment onto the user's real world. They don't integrate this device with technologies like CAVE or any external interface as secondary display as V.R. displays which create a large virtual space, thereby making the user feel like he is teleported.

Therefore, there is a need to provide a system and a method to create extended reality using wearables and virtual environment set, which overcomes few or all of the drawbacks of the existing reality devices.

OBJECTS OF THE INVENTION

An object of the present invention is to provide a system and a method to create extended reality using wearables and virtual environment set.

Another object of the present invention is to provide user access to an extended reality world by merging A.R wearable's and V.R. projections to create a mixed reality where objects of the virtual world are displayed either in the user's A.R. wearable or the V.R. displays based on the object's position and perspective.

Yet another object of the present invention is to provide a system to create extended reality using wearable and virtual environment set which can provide 360 degrees display with AR wearable or mobile phone tracking for providing extended reality application.

One more object of the present invention is to provide a system for providing extended reality worlds, which uses a display technique along with A.R wearable's in such a way that the real and virtual world merge by shifting display of complete and a part of virtual objects seamlessly between V.R. projections and user's A.R. wearable.

Still another object of the present invention is to provide a system for providing extended reality worlds, which can provide the user with vocal interaction abilities with the virtual characters and the user will be able to give voice commands to the application and the application will respond accordingly.

Another object of the present invention is to provide a system for providing extended reality worlds, which can create a movement for the user based on the virtual world interaction with him using simulators as a sensory device with the simulator being programmed according to application or the application enables the movement of the user according to the simulator.

Yet another object of the present invention is to provide a system for providing extended reality worlds, which enable the user to control his movement through a wearable sensor device.

Still another object of the present invention is to provide a system for providing extended reality worlds, which uses animatronics, mechanical simulators and robotics to control the motion of a user or the virtual reality environment set.

One more object of the present invention is to provide a system for providing extended reality worlds, which make the user move according to the virtual world's interaction with him/her and make him feel that the virtual part of the mixed reality world is interacting with him/her in real.

Further one more object of the present invention is to provide a system for providing extended reality worlds, which create a higher degree of the illusion through the merger of photorealistic graphics and realistic sets in the virtual reality environment set.

Still one more object of the present invention is to provide a system for providing extended reality worlds, which enables the user to move inside the virtual world and have a free roam inside the virtual reality environment set.

SUMMARY OF THE INVENTION

According to the present invention, system to create extended reality using wearables and virtual environment set is provided. The system includes a virtual reality environment set, a wearable device, a sensory device, a workstation and a server. The virtual reality environment set is an enclosed space with walls where a user can experience the virtual world and the reality world. The virtual reality environment set may be provided with a display device to display scenarios or object on to walls of the virtual reality environment set. In this embodiment, the display device is a projector arrangement arranged at predefined locations. The projectors project various views of the selected virtual background or scenarios or object or the like on to walls of the virtual reality environment set and stitch the views together to get panoramic view of the virtual world.

Inside the virtual environment reality set, the projectors provide a display of visuals or audio of at least one live virtual character or a scenario to interact virtually with the user. In the present embodiment, five projectors are configured on each sides of the walls to project the visuals to the walls of the virtual reality environment set. Inside the module the projectors acts as VR cameras in the virtual world. The workstation in the system enables the projectors to project the virtual reality projections. The workstation is connected to each of the projectors. The workstation in the present embodiment is a computer which allows the user to select the required type of visuals or audio of at least one live virtual character or a scenario according to the requirement of the user. The server has access to both the wearable and the work station. The server communicates with the wearable device and the workstation by a web page application.

Further, the wearable device is having a head mounted display. Specifically, the wearable device in the present embodiment is an AR/MR wearable or a mobile phone compatible with augmented reality/mixed reality configurable on the cardboard and mountable on a user's forehead. The wearable device is having an integrated camera to integrate the visuals of the virtual characters or scenarios in the virtual environment set. The wearable device has the ability to mark the start position of the user.

Further, the system is provided with a module inside the server. The module in the server locally detects both the workstation and the wearable device and allows the wearable device and the workstation to work simultaneously. The module enables the user to experience the extended reality inside the virtual reality environment set.

Initially, the physical dimensions and/or the appearance of a real-world environment, such as the interior, exterior, and surroundings is captured using methods like photogrammetry to make a 3D model of the virtual reality environment set and is imported to the module. The captured image of the virtual reality environment set being termed as an AR shield. Inside the module, the AR camera, VR camera and the 3D model are configured in such a way that they maintain the relative distance according to the real world environment.

Further, module runs a set of instruction necessary to run both the workstation and the wearable device. The module defines all rules of the virtual world that would create to overlay it on the real world.

The real world will mimic the virtual world dimensions, and when they are merged, the virtual world acts as extensions to the real world. The module is provided with 3D coordinates of the wearable device camera in the real world as input, which will be assigned to the camera in the virtual world and will also mark the start position of the user in the mixed reality world. This camera of the wearable device acts as the user's point of view in the virtual world. Also, the position of the user is given to the module by the wearable device to detect the position and the location of the wearable device.

The module inside the server continuously monitor the visuals displayed within the virtual reality environment set. Initially, the module detects the visuals of objects which fall outside and inside the AR shield. Also, the module detects the visuals which are extending beyond the dimensions of the AR shield. Specifically, the module identifies the visuals which fall outside and inside the AR shield. The module allows the workstation to displays the visuals which fall outside the AR shield as background on the walls of the virtual reality environment set. The object can be a scenario or a character or the like which is displayed on the walls of the virtual reality environment set. The module allows the wearable device to display the visuals which fall inside the AR shield as mixed reality/augmented reality to the user in the wearable device.

Specifically, inside the module, the objects which are crossing the AR shield is displayed in the AR display of the wearable device. If a partial part of the object falls inside the boundary of the virtual reality environment set, the partial object may display as mixed reality/augmented reality to the user. The module facilitates to selectively display the complete and part of virtual objects and shift the display seamlessly between V.R. projections and the A.R. wearable according to the position of the object.

Finally, the user can visualize the object or characters which are falling inside the AR shield appear in the real world in the room, and the background being displayed on the walls of the virtual reality environment set. Specifically, the module enables the wearable device to display visuals or scenario of the virtual world displayed in the walls as mixed reality/augmented reality to the user.

In another embodiment, a method to create extended reality using wearables and virtual environment set is provided. Initially, the objects or characters which fall inside the AR shield are marked by the module. Then, the objects or characters which extends beyond the room's dimensions or crossing the walls of the AR shield is again marked by the module. Further, the module detects the part of the objects or characters which is inside the AR shield and AR shield the room. Then, displaying the part of object or object as a whole falling outside the AR shield in the virtual reality environment set dynamically at any instance. Finally, the object or object as a whole which is inside the AR shield is switched OFF from the display of the VR camera and is displayed on the wearable device dynamically at any instance thereby displaying the object or character in 3D as mixed reality/augmented to the user.

BRIEF DESCRIPTION OF THE DRAWINGS

The advantages and features of the present invention will be understood better with reference to the following detailed description and claims taken in conjunction with the accompanying drawings, wherein like elements are identified with like symbols, and in which:

DETAIL DESCRIPTION OF THE INVENTION

An embodiment of this invention, illustrating its features, will now be described in detail. The words "comprising, "having, "containing," and "including," and other forms thereof, are intended to be equivalent in meaning and be open ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "an" and "a" herein do not denote a limitation of quantity, but rather denote the presence of at least one of the referenced item.

The disclosed embodiments are merely exemplary of the invention, which may be embodied in various forms.

The present invention is to provide a system and a method to create extended reality using wearables and virtual environment set. The system provides access to an extended reality world by merging A.R wearable's and V.R. projections to create a mixed reality where objects of the virtual world are displayed either in the user's A.R. wearable or the V.R. displays based on the object's position and perspective. The system can provide 360 degrees display with AR wearable or mobile phone tracking for providing extended reality application. The system creates a mixed reality world and extends 3D space virtually and moving in it to create an illusion of movement and extra space in the real world. The system also provides voice commands and neural networks in the extended reality world for the user to interact with the virtual world.

Figure 1:
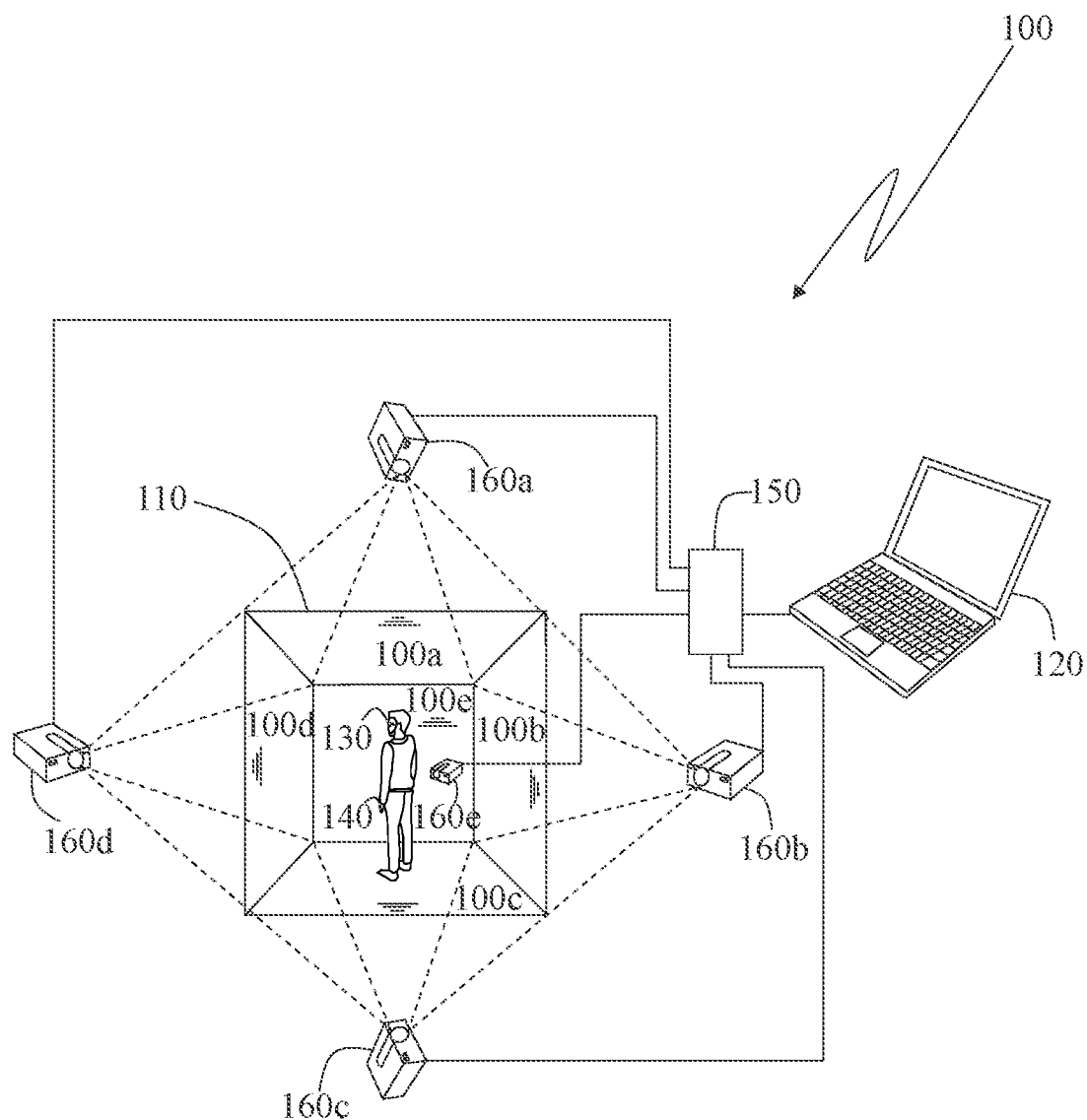
FIG. 1 illustrates a schematic representation of a system to create extended reality using wearables and virtual environment set in accordance with the present invention.

Referring now to FIG. 1, a system 100 to create extended reality using wearables and virtual environment set is illustrated. The system 100 includes a virtual reality environment set 110, a work station 120, a wearable device 130, a sensory device 140, and a server 150. The virtual reality environment set 110 is an enclosed space with walls 100a, 100b, 100c, 100d and 100e where a user can experience the virtual world and the reality world. The virtual reality environment set 110 is provided with a display device to display scenarios or object on to walls 100a, 100b, 100c, 100d and 100e of the virtual reality environment set 110. In the present embodiment, the display device is a projector arrangement arranged at predefined locations. It may be obvious to a person skilled in the art to configure any similar display device to project the objects.

The projectors project various views of the selected virtual background or scenarios or object or the like on to walls 100a, 100b, 100c, 100d and 100e of the virtual reality environment set 110 and stitch the views together to get a panoramic view of the virtual world. The virtual object is defined by a three-dimensional (3D) virtual model. In the present embodiment, the virtual reality environment set 110 uses 270 degree to 360 degree display to project the object. It may be obvious to a person skilled in the art to provide any other technology to create a virtual reality experience for the user.

Figure 2:
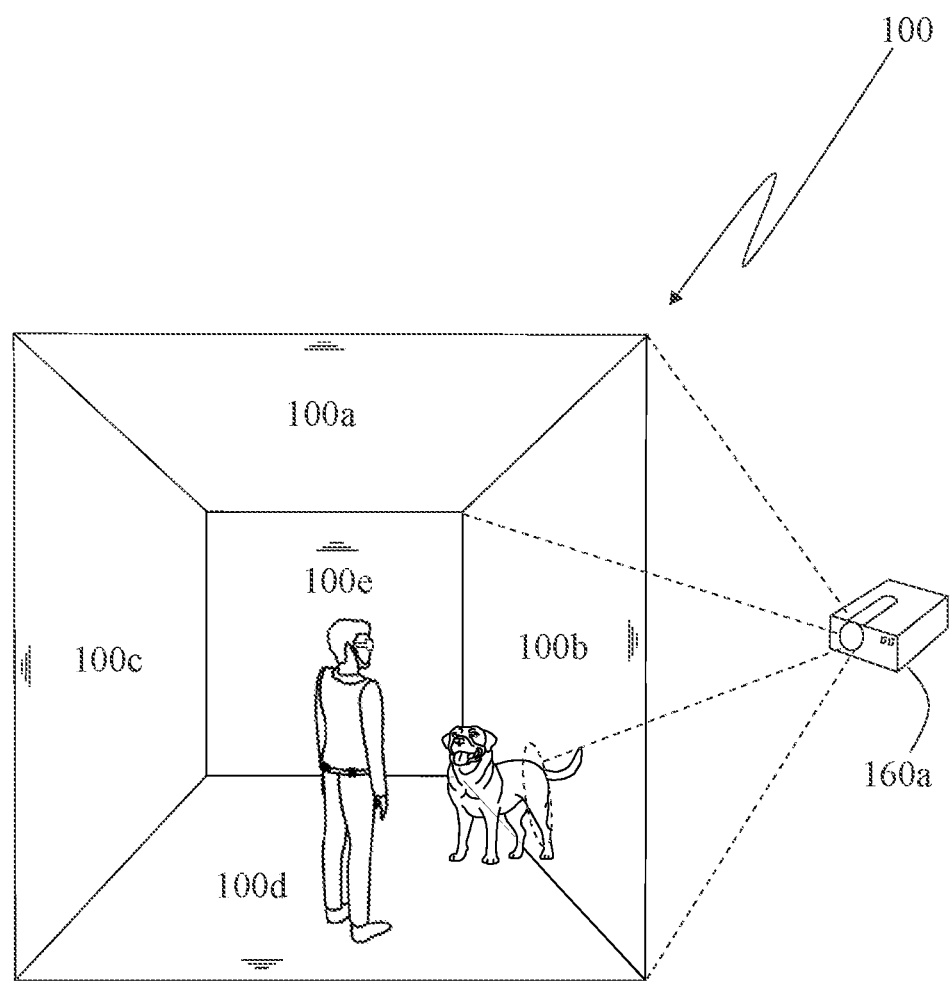
FIG. 2 illustrates an example of an object being visualised by a user in the virtual environment set in accordance with the present invention.
Figure 3:
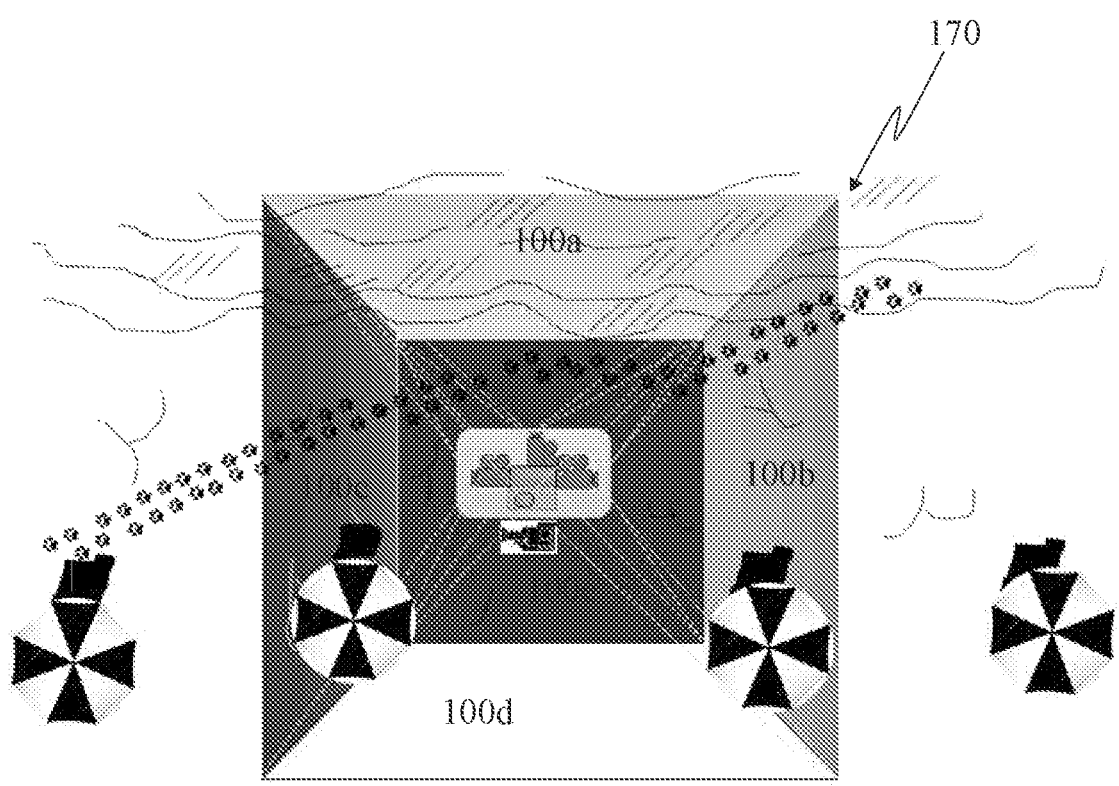
FIGS. 3 and 4 illustrates the virtual world inside the module having an AR shield.
Figure 4:
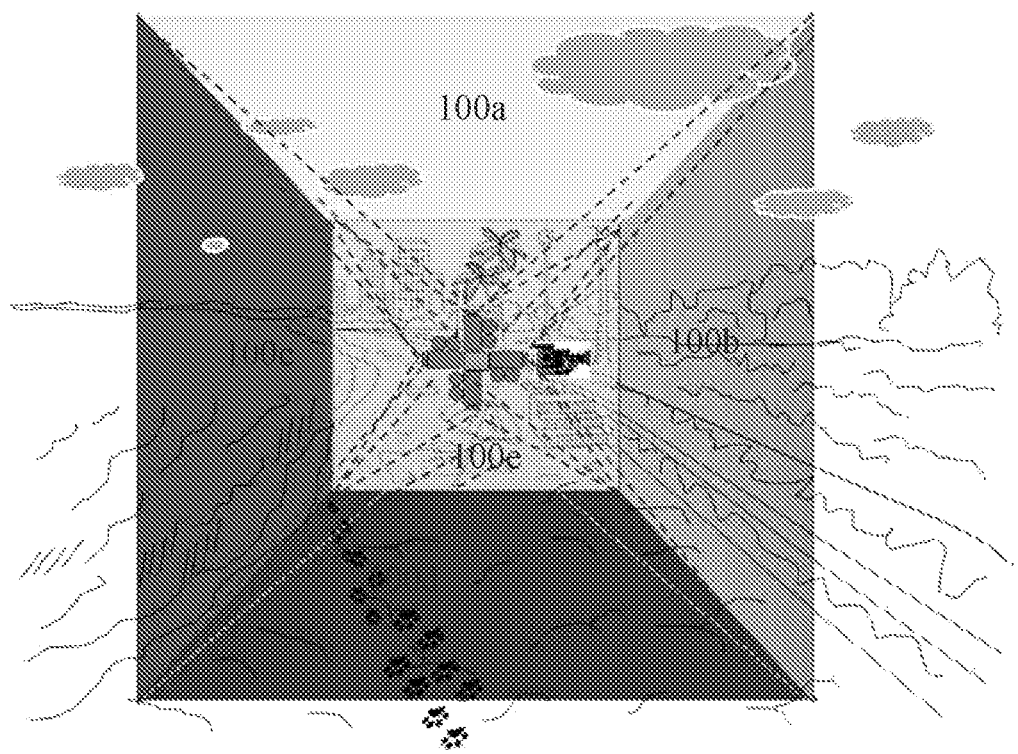

Inside the virtual reality environment set 110, the projectors displays visuals or audio of at least one live virtual character or a scenario or object to interact virtually with the user as shown in FIGS. 2, 3 and 4. The virtual reality environment set 110 can be customised with a plurality of projectors facing a different direction to project the object in VR projections. The projectors acts as VR cameras in the virtual world. By way of non-limiting example the present embodiment discloses five projectors 160a, 160b, 160c, 160d and 160e which are collectively configured on each sides of the walls 100a, 100b, 100c, 100d and 100e to project the visuals to the walls 100a, 100b, 100c, 100d and 100e of the virtual reality environment set 110 as shown in FIG. 1. The workstation 120 in the system 100 enables the projectors 160a, 160b, 160c, 160d and 160e to project the virtual reality projections. The workstation 120 is connected to each of the projectors 160a, 160b, 160c, 160d and 160e. The workstation 120 in the present embodiment is a computer which allows the user to select the required type of visuals or audio of at least one live virtual character or a scenario according to the requirement of the user. The server 150 has access to both the wearable device 130 and the work station 120. The server 150 communicates with the wearable device 130 and the workstation 120 by web page application. For example the server 150 may communicate using any web browser to communicate with the wearable device 130 and the workstation 120. It may be obvious to a person skilled in the art to communicate the server 150 with both the wearable device 130 and the workstation 120 using any other mediums of communication.

Further, the wearable device 130 is having a head mounted display. Specifically, the wearable device 130 in the present embodiment is an AR/MR wearable with see through capability. The wearable device 130 can also be a mobile phone compatible with augmented reality/mixed reality configurable on the cardboard and mountable on a user's forehead.

The wearable device 130 is having an integrated camera to integrate the visuals of the virtual characters or scenarios in the virtual reality environment set 110. The wearable device 130 has the ability to mark the start position of the user in the virtual reality environment set 110.

Further, the system 100 is provided with a module (not shown) inside the server 150. The module in the server 150 detects both the workstation 120 and the wearable device 130 and allows the wearable device 130 and the workstation 120 to work simultaneously. The module enables the user to experience the extended reality inside the virtual reality environment set 110. Inside the module, the display device/ the projectors acts as VR camera in the virtual world. The module differentiates the objects or visuals which has to be displayed on the wearable device 130 and the workstation 120. The module also positions the AR/MR wearable camera according to the position marked by the wearable device 130.

Further, the module run a set of instruction necessary to run both the workstation 120 and the wearable device 130 simultaneously. The module defines all rules of the virtual world that would create to overlay it on the real world. Initially, the physical dimensions and/or the appearance of a real-world environment, such as the interior, exterior, and surroundings is captured using methods like photogrammetry to make a 3D model of the virtual reality environment set 110 and is imported to the module. The captured image of the virtual reality environment set 110 being termed as an AR shield 170. FIG. 3 illustrates an example illustrating an image projected on the walls of the virtual reality environment set 110. This image acts as the AR shield 170 inside the module. Specifically, the AR shield 170 defines a virtual reality environment set boundary programmed inside the module to differentiate the projections of the objects. Inside the module, the AR camera, VR camera and the 3D model are configured in such a way that they maintain the relative distance according to the real world environment. This display is being visualised by the user when the user is wearing the wearable device 130 inside the virtual reality environment set 110.

The real world will mimic the virtual world dimensions, and when they are merged, the virtual world acts as extensions to the real world. The module is provided with 3D coordinates of the wearable device camera in the real world as input, which will be assigned to the VR camera in the virtual environment set and will also mark the start position of the user in the mixed reality world. This camera of the wearable device 130 acts as the user's point of view in the virtual world. The panoramic views allow 360° viewing of a particular scene from a fixed viewpoint. The user may pan, tilt, or zoom the panoramic view according to the requirement using the sensory device 140.

The wearable device 130 detects 3D coordinates of other objects in the real world help to overlay the virtual world on to the real world or extend the real world objects virtually. Using the camera and object tracking, both virtual and real lightings are controlled, thereby creating a perfect merger. This will create a visual perception for the user to believe or confuse the virtual world with being real.

Further, the system 100 extends 3D space virtually and moving in it to create an illusion of movement and extra space in the real world. In an embodiment, the wearable device 130 can be integrated with CAVE (Cave Automatic Virtual Environment) technology like virtual reality environment set 110 for creating extended virtual space and the illusion of the user travelling inside that space even though his/her position is confined to a certain perimeter in the real world. This creates a virtual environment inside the module which mimics the real environment.

The camera of the wearable device 130 device allows the user to create his point of view, which marks the starting point of the user in a real-world environment set 110. Also, the position of the user is given to the module by the wearable device 130 to detect the position and the location of the wearable device 130. The module uses the position of the camera of the wearable device 130 to provide the position of the user to the virtual reality environment set 110.

Figure 5:
FIGS. 5 and 6 illustrates the use of sensory device in the virtual reality environment set to virtually move the user inside the virtual worlds.
Figure 6:

This allows the virtual space to be displayed in the virtual reality environment set 110. Further, the system 100 uses the sensory device 140 for the user to experience the illusion of movement in the real world as shown in FIGS. 5 and 6. The sensory device 140 is also a wearable for detecting the motion of the user and gesture interaction with the virtual environment. The sensory device 140 is accessible by the server 150 and is connected to the server 150 through the workstation 120. The sensory device 140 may be a glove or shoes or any kind of simulator which facilitate gesture interaction with the virtual environment set. The sensory device 140 can be a motion simulator (Stewart platform or other mechanical simulators). The display of the virtual environment in the virtual reality environment set 110 moves according to the sensory device 140 (car simulator or dragon simulator) in the real environment and vice versa syncing the movement as programmed in the module. This will create a perfect illusion of user freely moving in the virtual space using a real object, though, in reality, his/her movement is very confined.

The module inside the server 150 continuously monitor the visuals displayed within the virtual reality environment set 110. Initially, the module detects the visuals of objects which fall outside and inside the AR shield 170. Also, the module detects the visuals which are extending beyond the dimensions of the AR shield 170. Specifically, the module identifies the visuals which fall outside and inside the AR shield 170. The module allows the workstation 120 to displays the visuals which fall outside the AR shield 170 as background on the walls 100a, 100b, 100c, 100d and 100e of the virtual reality environment set 110. The object can be a scenario or a character or the like which is displayed on the walls 100a, 100b, 100c, 100d and 100e of the virtual reality environment set 110. The module allows the wearable device 130 to display the visuals which fall inside the AR shield 170 as mixed reality/augmented reality to the user in the wearable device 130.

Figure 9:
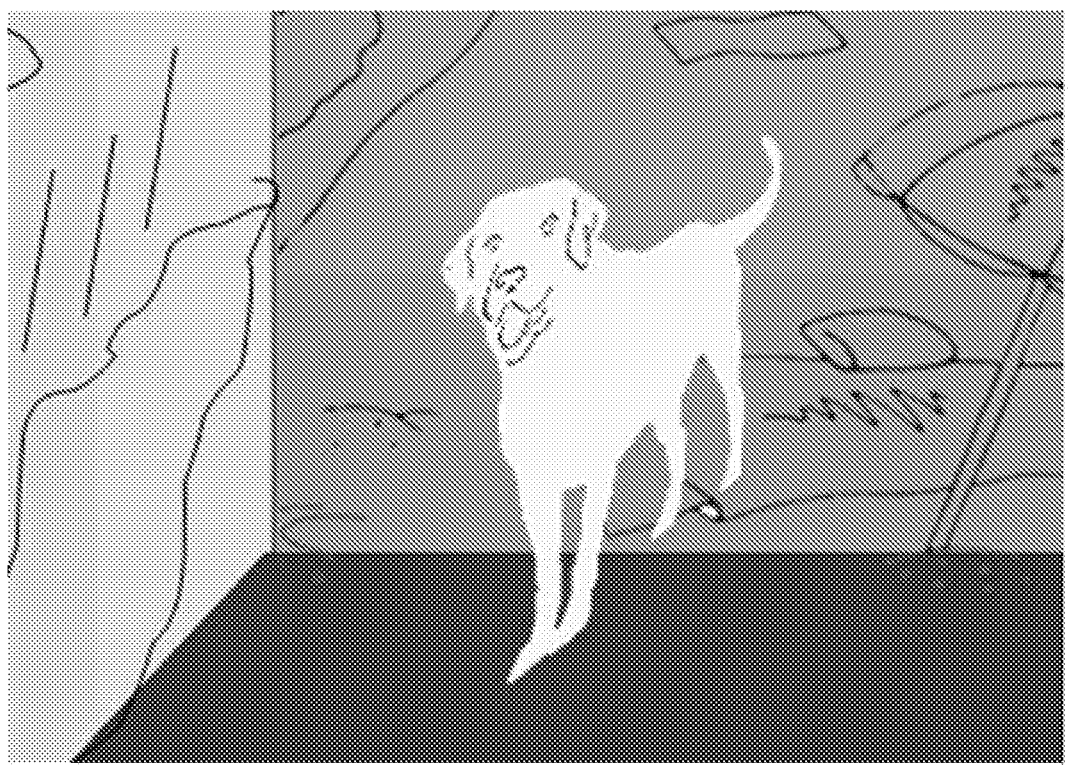
FIG. 9 illustrates the users point of view when the object crosses the AR shield.

Specifically, inside the module, the objects which are crossing the AR shield 170 is displayed in the AR display of the wearable device 130. If a part of the object falls inside the boundary of the virtual reality environment set 110, the object may display as mixed reality/augmented reality to the user as shown in FIG. 9. The module facilitates to selectively display the complete and part of virtual objects and shift the display of the object dynamically and seamlessly between V.R. projections and the wearable device 130 according to the position of the object.

Figure 7:
FIG. 7 illustrates a third person view visualizing the user and the virtual characters beyond the AR shield inside the virtual reality environment set.
Figure 8:
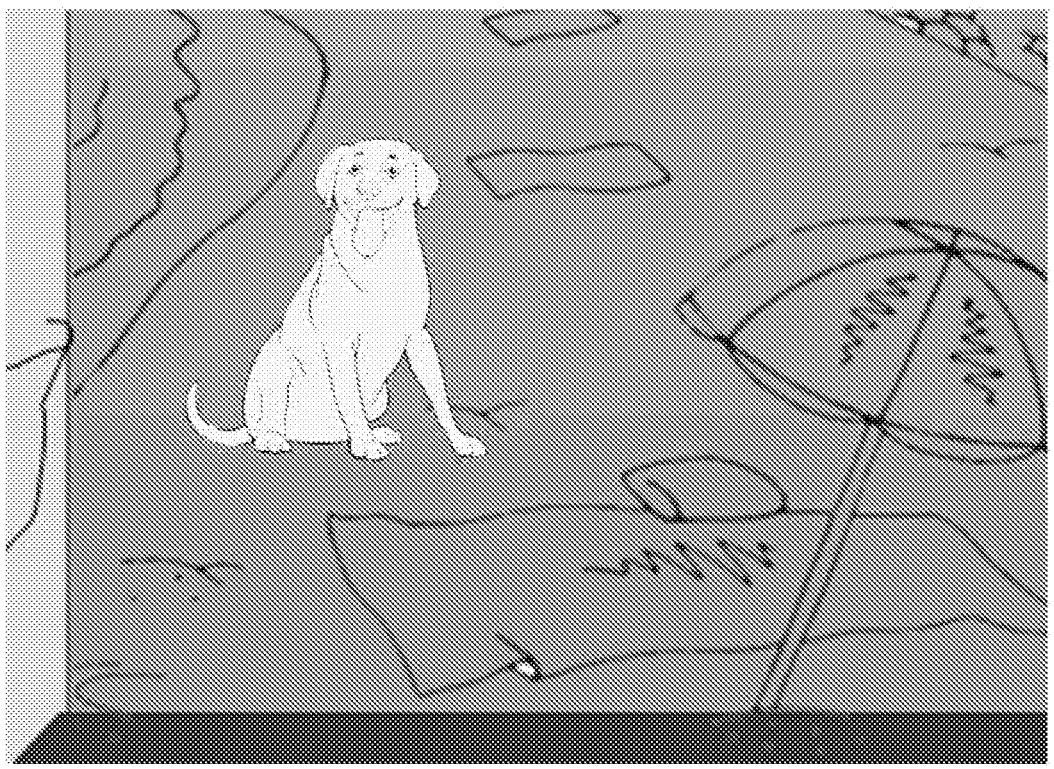
FIG. 8 illustrates the users point of view of the virtual characters inside the virtual reality environment set.
Figure 10:
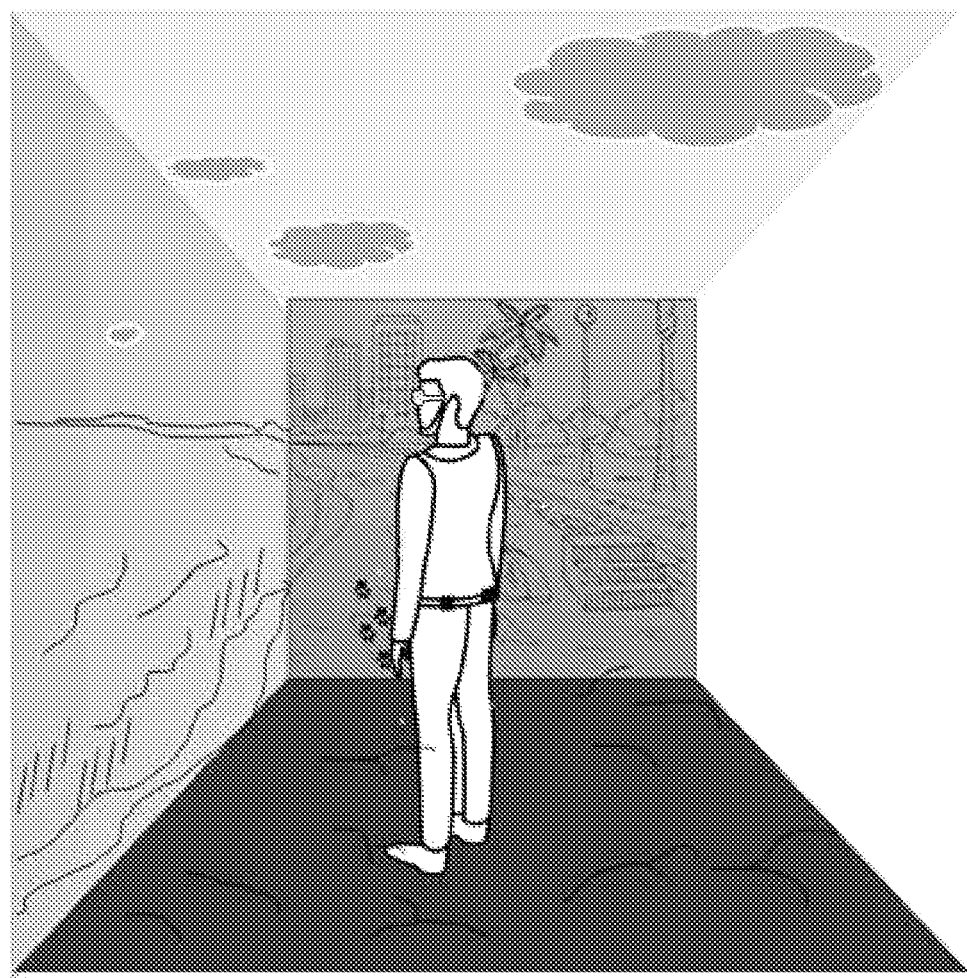
FIG. 10 illustrates the third person view of the virtual reality environment set when the virtual characters is inside the AR shield.

Finally, the user can visualize the object or characters which are falling inside the AR shield appearing the real world in the room, and the background being displayed on the walls 100a, 100b, 100c, 100d and 100e of the virtual reality environment set 110 as shown in FIG. 9. Specifically, the module enables the wearable device 130 to display visuals or scenario of the virtual world displayed in the walls 100a, 100b, 100c, 100d and 100e as mixed reality to the user merging in the real world in the wearable device 130. When the virtual characters are beyond the AR shield 170, a third person can able to visualize the object inside the virtual reality environment set 110 as shown in FIG. 7. When the virtual characters are beyond the AR shield 170, the user also visualizes the object in the display walls of the VR camera as shown in FIG. 8. But when the virtual character or the object is completely inside the AR shield 170, the third person cannot visualize the presence of the object in the virtual reality environment set 110 as the display has been shifted to the AR wearable as shown in FIG. 10. The user visualizes the object as augmented reality/mixed reality in the wearable device 130 as shown in FIG. 9.

The user may have control to move the viewpoint and rotate the current view as if one were walking through the real-world environment and looking around. The user may also move the viewpoint vertically upwards or downwards, as if one were flying or hovering in the real-world environment. Such actions may generate perspectives and viewpoints that could not be achieved in the real-world environment. In the present embodiment, the module is programmed in such a way that inside the module, the 3D model of the virtual reality environment set 110, VR camera and the AR camera of user are moved together maintaining the distances relative to each other inside the virtual world when the user is controlling his/her movement in the virtual world using the sensory device 140. The movement of the user inside the module is possible only by virtually moving the entire system 100 inside the module. The movement of the user inside the module means, the movement of the user inside the illusion created by the wearable device 130 allowing the user to visualise a virtual world replicating the real world.

Further, the AR camera locally moves inside the module while the user is moving inside the enclosed space of the virtual reality environment set 110. Referring to FIGS. 5 and 6, the user uses the sensory device 140 to move inside the module and the user moves around inside the enclosed space of the virtual reality environment set 110. When the user moves around inside the room, the AR camera has to move inside the space enclosed in the virtual reality environment set 110. When the position of the user moves, the module has to co-ordinate with the virtual reality boundary inside the module. The virtual reality environment set 110 is moving inside the module, so the AR camera has to move in the space of the virtual reality environment set 110.

More specifically, the module is programmed in such a way that the movement of the AR camera is altered according to the users movement inside the virtual reality environment set 110 while simultaneously moving the AR camera in relation with the VR camera when the user is controlling his/her movement in the virtual world.

The system 100 may also uses voice commands and neural networks in Extended Reality world for the user to interact with the virtual world. In an embodiment, the system 100 is integrated with Google MY kit to the wearable device. This enables voice recognition and interaction through voice commands with the mixed reality device. The system 100 may also integrate CTRL-Kit of CTRL-LABS for detecting nerve response of the user to activate the response in the virtual world.

Further, the system 100 may use haptic sensors and Robotics in Extended Reality world for enabling the virtual world to interact with the user. The system 100 may use Tesla haptic suits for producing thermal and touch sensation to the user as per the virtual world interaction. The system 100 may also use robotics for creating motion controlled magnetic rigs for the user to manage his movement according to the interaction of the virtual world with him.

Figure 11:
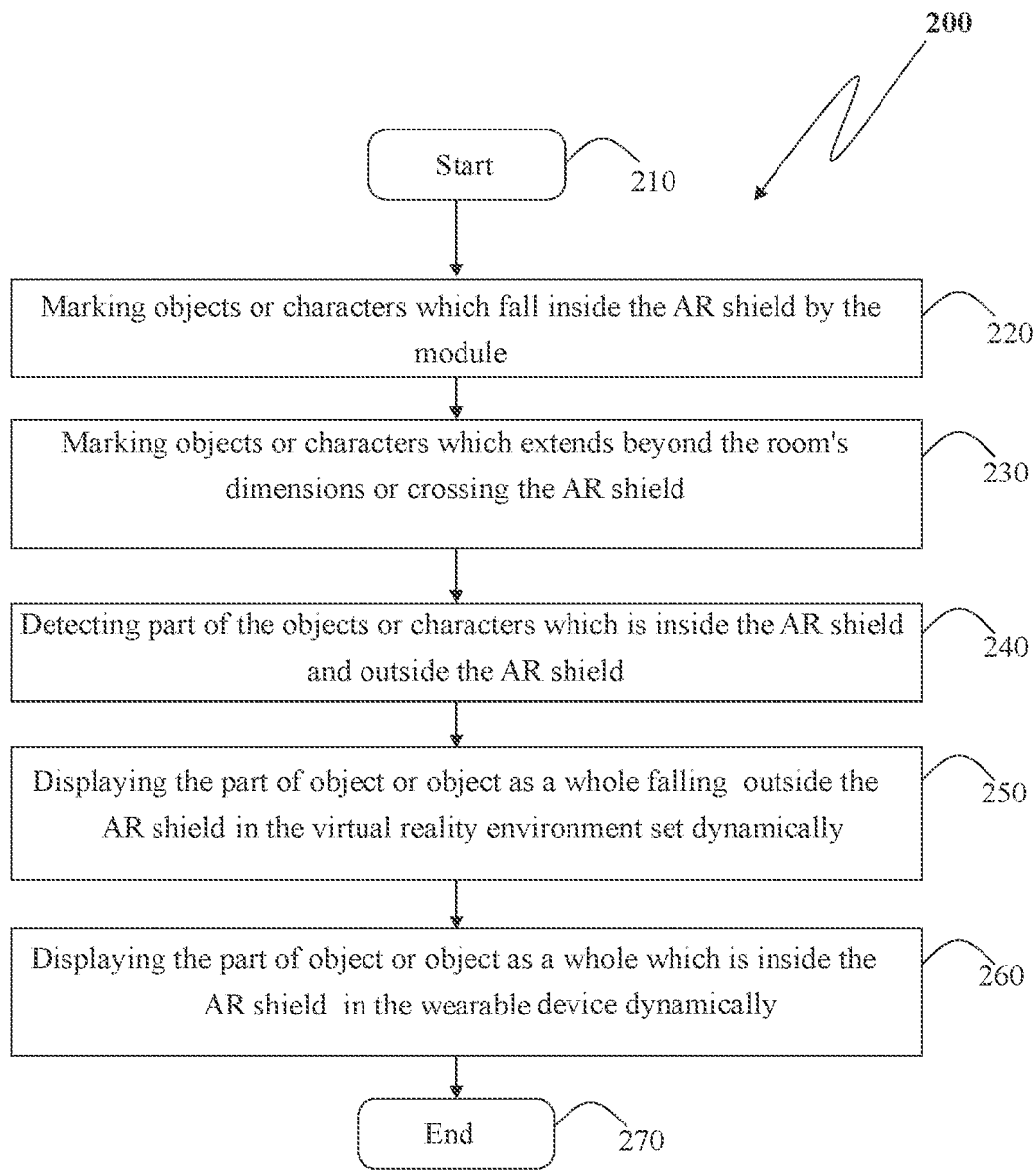
FIG. 11 illustrates a method to create extended reality using wearables and virtual environment set.

Further, referring to FIG. 11 (flow chart), a method 200 to create extended reality using wearables and virtual environment set in accordance with the present invention is illustrated. For the sake of brevity, the method 200 is described in conjunction with the system 100.

The method 200 starts at step 210.

At step 220, the visuals of the objects or characters which fall inside the AR shield 170 are marked by the module inside the server 150. The AR shield 170 is the captured 3D model of the virtual reality environment set 110.

At step 230, the objects or characters which extends beyond the room's dimensions or crossing the walls 100*a*, 100*b*, 100*c*, 100*d* and 100*e* or the AR shield 170 is also marked by the module.

Further, at step 240, the module detects the part of the objects or characters which is inside the AR shield 170 and outside the AR shield 170.

At step 250, the display of the part of object or object as a whole falling outside the AR shield 170 is displayed in the virtual reality environment set 110 dynamically at any instance. The module shifts the objects according to the position of the user.

Further at step 260, the display of the object or object as a whole which is inside the AR shield 170 is switched OFF in the VR camera and is displayed in the wearable device 130 dynamically at any instance thereby displaying the object or character in as a mixed reality/augmented reality to the user The method ends at step 270.

Therefore the present invention has the advantage of providing a system 100 and a method 200 to create extended reality using wearables and virtual environment set. The system 100 provides user access to an extended reality world by merging A.R wearable's and V.R. projections to create a mixed reality where objects of the virtual world are displayed either in the user's A.R. wearable or the V.R. displays based on the object's position and perspective. Further, the system 100 provides extended reality worlds which can provide 360 degrees display with AR wearable or mobile phone tracking for providing extended reality application. Also, the system 100 uses a display technique along with A.R wearable's in such a way that the real and virtual world merges by shifting display of complete and part of virtual objects seamlessly between V.R. projections and user's A.R. wearable. The system 100 uses animatronics, mechanical simulators and robotics to control the motion of a user or the environment in the virtual world. The system 100 makes the user move according to the virtual world's interaction with him/her and make him feel that the virtual part of the mixed reality world is interacting with him in real. Further, the system 100 creates a higher degree of the illusion of the real world.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

I claim:

1. A system 100 to create extended reality using wearables and virtual environment set, the system 100 comprising:
   a virtual reality environment set 110, the virtual reality environment set 110 being an enclosed space in which a display device is configured to display VR projections of visuals of at least one live virtual character or a scenario to interact virtually with a user;
   a workstation 120 connected to the display device, the workstation enables the display device to project the visuals on the virtual reality environment set;
   a wearable device 130 having a head mounted display and see through capability;
   a sensory device 140 wearable by the user for detecting the motion of the user and gesture interaction with the virtual environment; and
   a server 150 having access to the workstation 120, the wearable device 130 and the sensory device 140;
   characterized in that, the wearable device 130 is having an integrated AR camera to integrate the visuals of the virtual characters or scenarios in the virtual environment set 110, wherein the wearable device 130 mark a start position of the user in the virtual reality environment set 110,
   wherein a module is provided in the server, the module is preinstalled with a 3D model of the virtual reality environment set 110, the module having a preprogrammed virtual reality environment set boundary to differentiate a projection of an object; and
   the module differentiates the objects and visuals which has to be displayed on the wearable device 130 and the workstation 120 and, the module facilitates in selectively displaying complete or a part of virtual objects and shift the display dynamically and seamlessly between VR projections and the wearable device 130.

2. The system 100 as claimed in claim 1, wherein inside the module, the objects crossing the virtual reality environment set boundary or the 3D model of the virtual reality environment set is displayed in the AR display of the wearable device 130.

3. The system 100 as claimed in claim 1, wherein inside the module, the AR camera moves according to the users movement when the user moves around inside the enclosed space within the virtual reality environment set 110.

4. The system 100 as claimed in claim 1, wherein the module is programmed in such a way that inside the module, the 3D model of the virtual reality environment set 110, a VR camera and the AR camera of user are moved together maintaining the distances relative to each other inside a virtual world when the user is controlling his/her movement in the virtual world using the sensory device 140.

5. The system 100 as claimed in claim 1, wherein the module is programmed in such a way that the movement of the AR camera is altered according to the users movement inside the virtual reality environment set 110 while simultaneously moving the AR camera in relation with the VR camera when the user is controlling his/her movement in a virtual world.

6. The system 100 as claimed in claim 1, wherein the wearable device 130 is an AR/MR wearable or a mobile phone compatible with augmented reality/mixed reality.

7. The system 100 as claimed in claim 1, wherein the module identifies the visuals which fall outside and inside the 3D model of the virtual reality environment set 110, wherein the visuals which fall outside the 3D model of the virtual reality environment is displayed as a background of the virtual reality environment set 110.

8. The system 100 as claimed in claim 1, wherein the module displays the visuals which fall inside the 3D model of the virtual reality environment as augmented reality/mixed reality in the wearable device 130.

9. The system 100 as claimed in claim 1, wherein the start position of the user is given to the module by the wearable device 130 to detect a position and a location of the wearable device 130.

10. A method 200 to create extended reality using wearables and virtual environment set, the method 200 being performed by a server 150 having a module preinstalled with a 3D model of the virtual reality environment set 110 matching the dimensions of the virtual reality environment set 110 and the module is programmed to enable visualisation of augmented reality/mixed reality and VR projections in a wearable device 130 and a workstation 120, the method 200 comprising the steps of:
  marking objects or characters which fall inside the 3D model of the virtual reality environment set by the module;
  marking objects or characters which extends beyond a room's dimensions or crossing the 3D model of the virtual reality environment set;
  detecting part of the objects or characters which is inside the 3D model of the virtual reality environment set or outside the 3D model of the virtual reality environment set;
  displaying the part of object or object as a whole falling outside the 3D model of the virtual reality environment set in the virtual reality environment set 110 dynamically at any instance; and
  displaying the part of object or object as a whole which is falling inside the 3D model of the virtual reality environment set 110 in the wearable device 130 dynamically at any instance thereby displaying the object or character in mixed reality/augmented reality to a user.

11. The method 200 as claimed in claim 10, wherein the module selectively display complete or a part of virtual objects and shift the display of the object dynamically and seamlessly between VR projections and the wearable device 130.

\* \* \* \* \*